United States Patent
Blake

(10) Patent No.: US 6,234,662 B1
(45) Date of Patent: May 22, 2001

(54) COOKING WHIP

(76) Inventor: Peter Blake, 375 State St., Apt. 818, Bldg. 8, Perth Amboy, NJ (US) 08861

(*) Notice: Subject to any disclaimer, the term of this patent is extended or adjusted under 35 U.S.C. 154(b) by 0 days.

(21) Appl. No.: 09/328,995

(22) Filed: Jun. 10, 1999

(51) Int. Cl.[7] ........................................... B01F 7/32
(52) U.S. Cl. .................. 366/129; 366/130; 366/342; 366/343; 366/344; 99/348; 15/141.1; 15/141.2
(58) Field of Search ..................... 366/129, 130, 366/343, 342, 344; 99/348; 15/141.1, 141.2; 416/69, 70 R, 227 R, 231 A

(56) References Cited

U.S. PATENT DOCUMENTS

| 2,208,337 | * | 3/1940 | Maslow . | |
| 5,125,751 | * | 6/1992 | Colgley | 366/129 |
| 5,380,087 | * | 1/1995 | Haber et al. . | |
| 5,947,595 | * | 9/1999 | Eurisch et al. | 366/129 |

* cited by examiner

Primary Examiner—John Kim
Assistant Examiner—Michael A. Fleming

(57) ABSTRACT

A cooking whip for mixing foods is disclosed. The cooking whip includes an elongate tubular handle portion. A whip portion has a head and a plurality of resiliently deformable loops extending from the head. The whip portion is detachably coupled to the lower end of the handle portion. An elongate shaft portion with opposite first and second ends and a longitudinal axis extending between the ends is removably insertable in the handle portion. The first end of the shaft portion is coupled to the head of the whip portion.

12 Claims, 4 Drawing Sheets

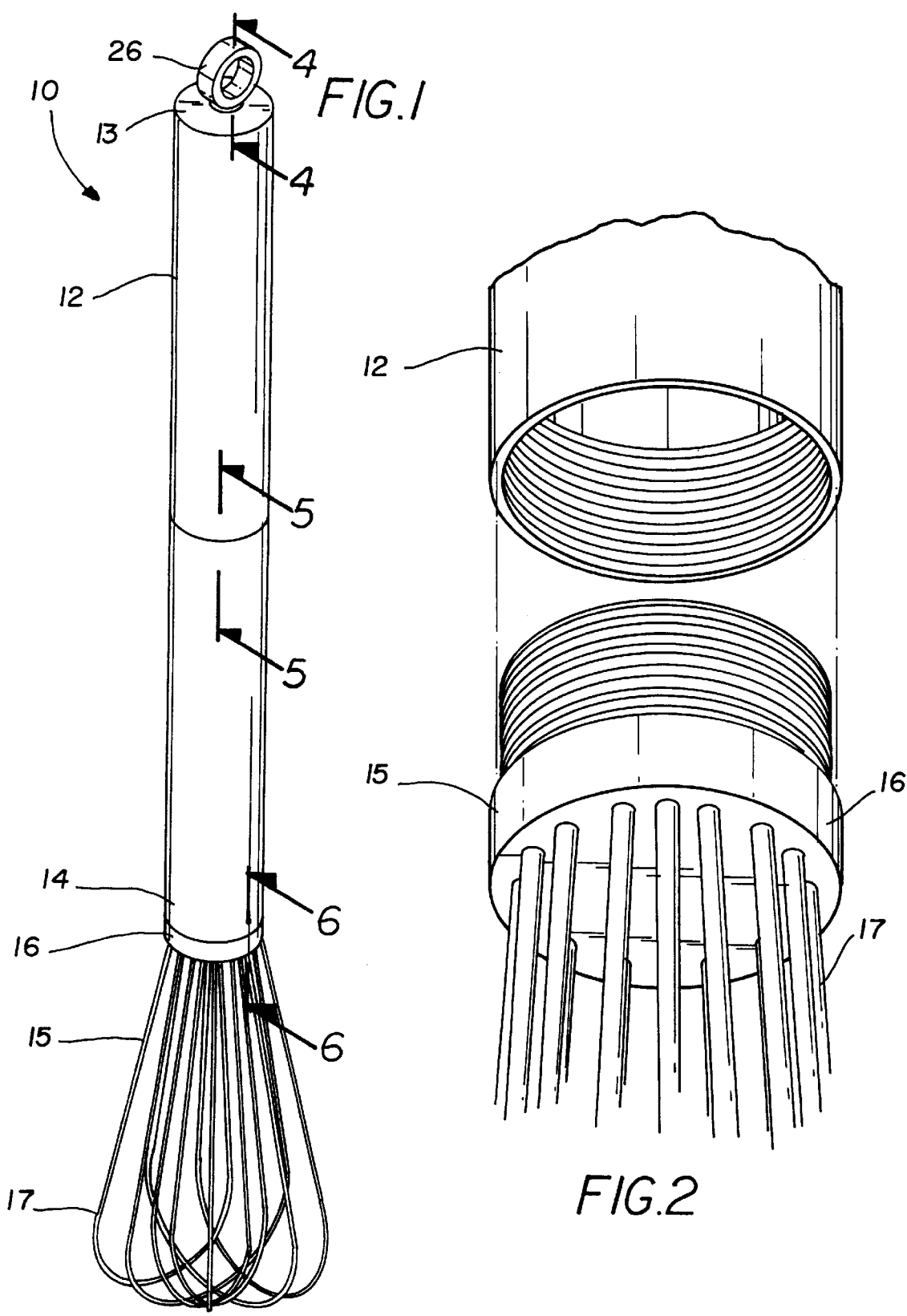

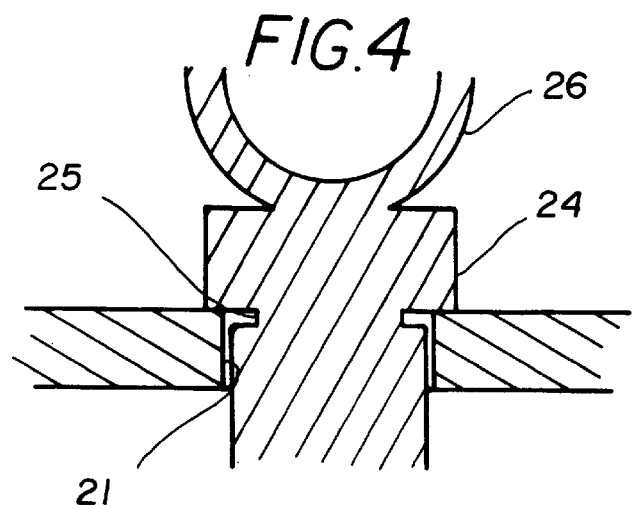
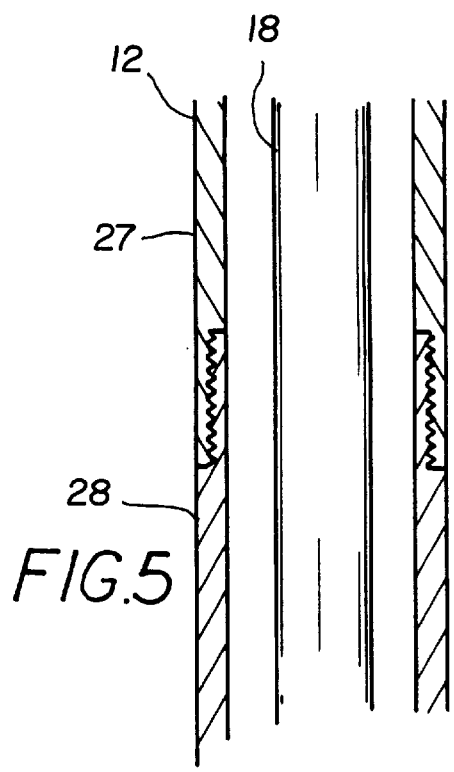
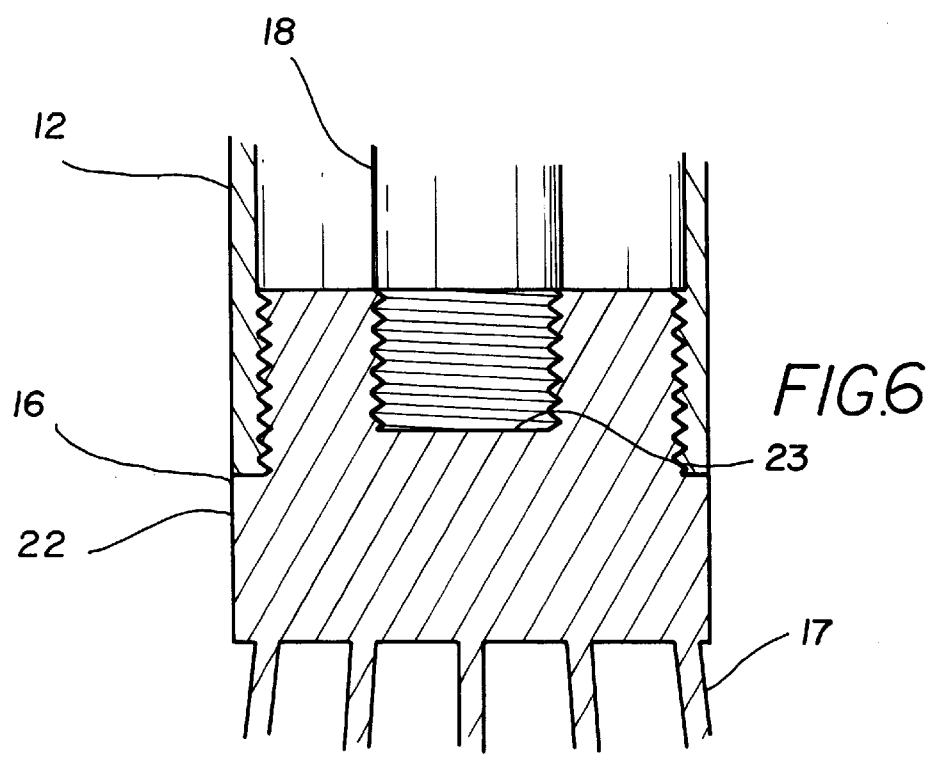

COOKING WHIP

BACKGROUND OF THE INVENTION

1. Field of the Invention

The present invention relates to cooking utensils and more particularly pertains to a new cooking whip for mixing foods.

2. Description of the Prior Art

The use of cooking utensils is known in the prior art. More specifically, cooking utensils heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 884,085; U.S. Pat. No. 871,247; U.S. Pat. No. 2,208,337; U.S. Pat. No. 4,730,939; U.S. Pat. No. 4,575,255; U.S. Pat. No. 4,735,510; and U.S. Pat. No. Des. 292,959.

While these devices fulfill their respective, particular objectives and requirements, the aforementioned patents do not disclose a new cooking whip. The inventive device includes an elongate tubular handle portion. A whip portion has a head and a plurality of resiliently deformable loops extending from the head. The whip portion is detachably coupled to the lower end of the handle portion. An elongate shaft portion with opposite first and second ends and a longitudinal axis extending between the ends is removably insertable in the handle portion. The first end of the shaft portion is coupled to the head of the whip portion.

In these respects, the cooking whip according to the present invention substantially departs from the conventional concepts and designs of the prior art, and in so doing provides an apparatus primarily developed for the purpose of mixing foods.

SUMMARY OF THE INVENTION

In view of the foregoing disadvantages inherent in the known types of cooking utensils now present in the prior art, the present invention provides a new cooking whip construction wherein the same can be utilized for mixing foods.

The general purpose of the present invention, which will be described subsequently in greater detail, is to provide a new cooking whip apparatus and method which has many of the advantages of the cooking utensils mentioned heretofore and many novel features that result in a new cooking whip which is not anticipated, rendered obvious, suggested, or even implied by any of the prior art cooking utensils, either alone or in any combination thereof.

To attain this, the present invention generally comprises an elongate tubular handle portion. A whip portion has a head and a plurality of resiliently deformable loops extending from the head. The whip portion is detachably coupled to the lower end of the handle portion. An elongate shaft portion with opposite first and second ends and a longitudinal axis extending between the ends is removably insertable in the handle portion. The first end of the shaft portion is coupled to the head of the whip portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cooking whip apparatus and method which has many of the advantages of the cooking utensils mentioned heretofore and many novel features that result in a new cooking whip which is not anticipated, rendered obvious, suggested, or even implied by any of the prior art cooking utensils, either alone or in any combination thereof.

It is another object of the present invention to provide a new cooking whip which may be easily and efficiently manufactured and marketed.

It is a further object of the present invention to provide a new cooking whip which is of a durable and reliable construction and with interchangeable parts for ready replacement.

An even further object of the present invention is to provide a new cooking whip which is susceptible of a low cost of manufacture with regard to both materials and labor, and which accordingly is then susceptible of low prices of sale to the consuming public, thereby making such cooking whip economically available to the buying public.

Still yet another object of the present invention is to provide a new cooking whip which provides in the apparatuses and methods of the prior art some of the advantages thereof, while simultaneously overcoming some of the disadvantages normally associated therewith.

Still another object of the present invention is to provide a new cooking whip for mixing foods.

Yet another object of the present invention is to provide a new cooking whip which includes an elongate tubular handle portion. A whip portion has a head and a plurality of resiliently deformable loops extending from the head. The whip portion is detachably coupled to the lower end of the handle portion. An elongate shaft portion with opposite first and second ends and a longitudinal axis extending between the ends is removably insertable in the handle portion. The first end of the shaft portion is coupled to the head of the whip portion.

Still yet another object of the present invention is to provide a new cooking whip that may be easily disassembled for cleaning and replacing parts.

Even still another object of the present invention is to provide a new cooking whip that has an inner rod and a spaced outer shell for improved strength and stability.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new cooking whip according to the present invention.

FIG. 2 is a schematic detailed perspective view of the present invention.

FIG. 4 is a schematic cross sectional view of the present invention taken from line 4—4 of FIG. 1.

FIG. 5 is a schematic cross sectional view of the present invention taken from line 5—5 of FIG. 1.

FIG. 6 is a schematic cross sectional view of the present invention taken from line 6—6 of FIG. 1.

DESCRIPTION OF THE PREFERRED EMBODIMENT

Figure 3:
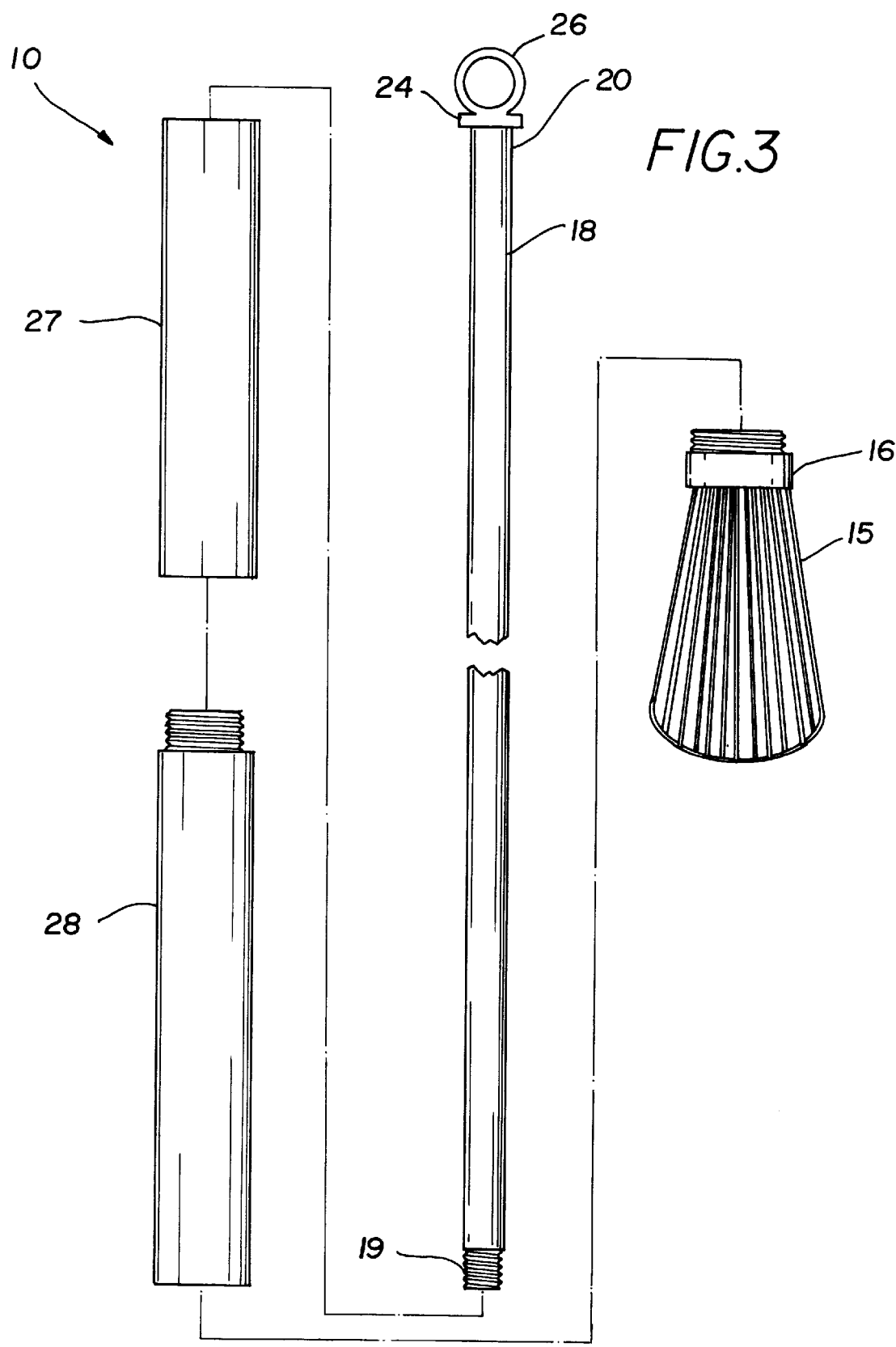
FIG. 3 is a schematic exploded view of the present invention.

With reference now to the drawings, and in particular to FIGS. 1 through 7 thereof, a new cooking whip embodying the principles and concepts of the present invention and generally designated by the reference numeral 10 will be described.

As best illustrated in FIGS. 1 through 7, the cooking whip 10 generally comprises an elongate tubular handle portion 12 with upper and lower ends 13,14 and a longitudinal axis extending between the ends. A whip portion 15 has a head 16 and a plurality of resiliently deformable loops 17 extending from the head. The whip portion is detachably coupled to the lower end of the handle portion. An elongate shaft portion 18 with opposite first and second ends 19,20 and a longitudinal axis extending between the ends is removably insertable in the handle portion. The first end of the shaft portion is coupled to the head of the whip portion.

In more detail, an elongate tubular handle portion has a closed upper end and an open lower end and a longitudinal axis extending between the ends. Preferably, the lower end of the handle portion is internally threaded and the upper end of the handle portion has an aperture 21 through it.

A whip portion has a head and a plurality of overlapping resiliently deformable loops extending from the head. The head of the whip portion is externally threaded and is threadedly coupled to the lower end of the handle portion, ideally such that the outer surface of the handle portion and the nonthreaded portion 22 of the whip head are flush. Ideally, the head of the whip portion has seven loops.

Preferably, the head of the whip portion has a threaded bore 23 extending centrally therein opposite the loops.

An elongate shaft portion has opposite first and second ends and a longitudinal axis extending between the ends. The shaft portion is removably insertable in the handle portion. Preferably, the first end of the shaft portion is externally threaded and threadedly coupled to the threaded bore of the head of the whip portion.

Preferably, the second end of the shaft portion has a generally circular abutting flange 24 extending therearound generally perpendicularly to the longitudinal axis of the shaft portion. The abutting flange engages the upper end of the handle portion. Ideally, the abutting flange of the second end of the shaft portion has an outer diameter greater than the inner diameter of the aperture of the upper end of the handle portion.

More preferably, as best shown in FIG. 4, the shaft portion has an annular channel 25 extending around it adjacent the abutting flange of the second end of the shaft portion for permitting flexing of the abutting flange when the shaft portion is tightened against the upper end of the handle portion to form a seal between the abutting flange and the handle portion.

Preferably, the second end of the shaft portion has a loop 26 extending therefrom adapted to receive a hook (not shown) for hanging of the shaft portion from the hook or similar object. The loop also provides a grip for a user to grasp when tightening or disassembling the cooking whip.

Also preferably, the handle portion has first and second portions 27,28 that are threadedly coupled together for easier disassembly and cleaning. The first portion is positioned towards the upper end of the handle portion. The second portion is positioned towards the lower end of the handle portion. This way, the second portion may be replaced when damaged without having to replace the entire handle portion. This is particularly important in the cooking industry, where chefs and cooks often strike a cooking whip against the rim of a container to shake food from the whip.

Figure 7:
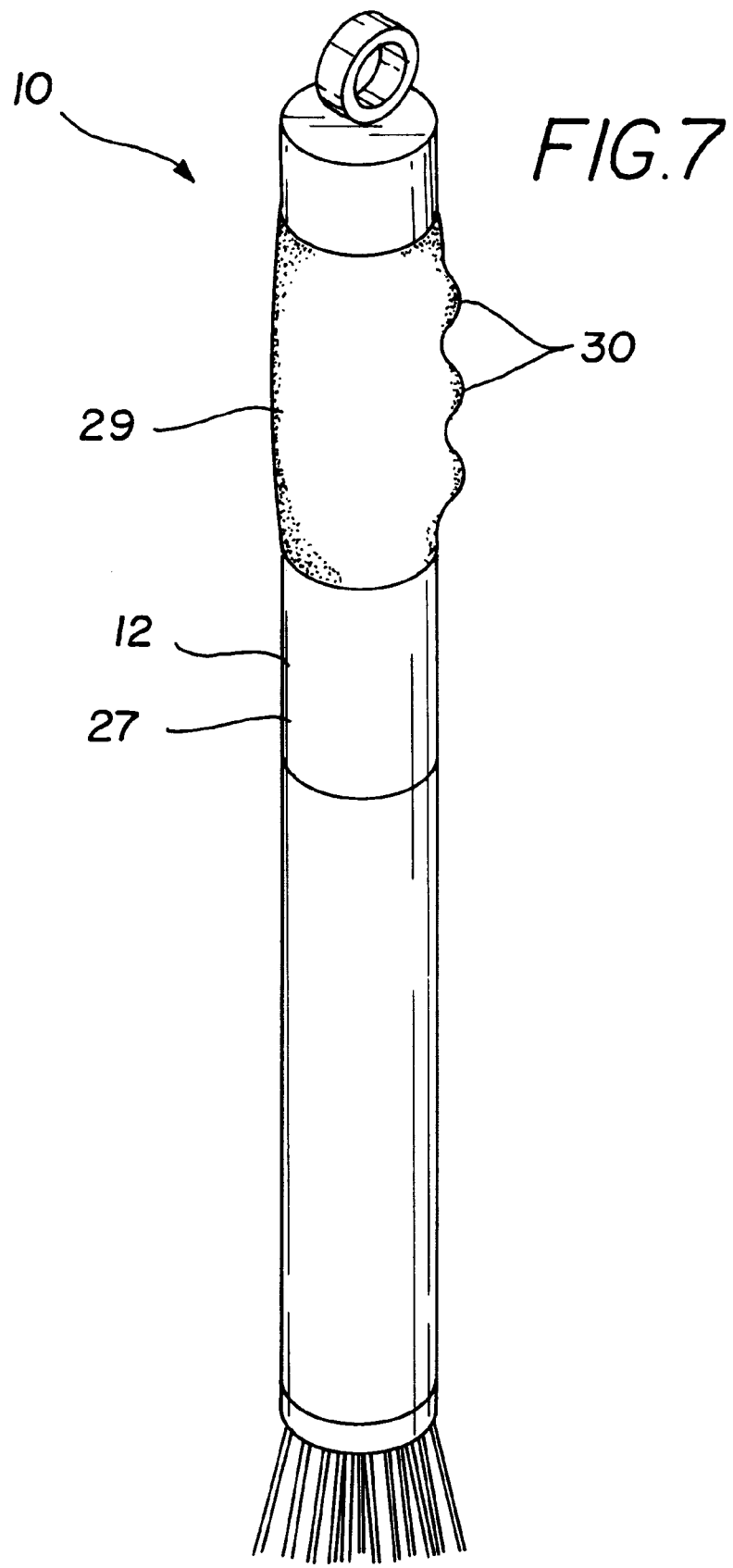
FIG. 7 is a schematic perspective view of the present invention with an optional gripping portion.

Preferably, referring to FIG. 7, the first portion of the handle portion has a resiliently deformable gripping sleeve 29 extending around it. The gripping sleeve is adapted to frictionally engage a hand of a user to prevent slipping of the hand along the handle portion. Optionally, the gripping sleeve could have a series of protuberances 30 extending outwardly from it for helping prevent slipping of fingers of a hand along the gripping sleeve. Ideally, the protuberances would be aligned in a single row generally parallel the longitudinal axis of the handle portion.

Alternatively, or in conjunction with the gripping sleeve, the first portion of the handle portion has a series of protuberances extending outwardly therefrom for preventing slipping of fingers of a hand along the handle portion. Ideally, the protuberances are aligned in a single row generally parallel the longitudinal axis of the handle portion. The gripping sleeve would extend outwardly over the protuberances.

The preferred length of the assembled cooking whip from tip to tip along its longitudinal axis is between about 10 and 26 inches, ideally about 24 inches. The whip portion should comprise between about ⅕ and ⅓ the total length of the cooking whip, ideally about ¼ of the total length.

In use, the first and second portions of the handle portion are coupled together. The head of the whip portion is attached to the threaded bottom end of the handle portion. The shaft portion is inserted through the aperture in the upper end of the handle portion and the threaded first end of the shaft portion is screwed into the threaded bore of the head of the whip portion. The loop of the second end of the shaft portion is grasped and twisted to rotate the shaft portion to tighten the pressure between the abutting flange and the upper end of the handle portion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooking utensil for mixing foods, comprising:

an elongate tubular handle portion having upper and lower ends and a longitudinal axis extending between said ends;

a whip portion having a head and a plurality of resiliently deformable loops extending from said head, said whip portion being detachably threadedly coupled to said lower end of said handle portion;

an elongate shaft portion having opposite first and second ends and a longitudinal axis extending between said ends, said shaft portion being removably inserted in said handle portion with said second end of said shaft portion being releasably coupled to said upper end of said handle portion and extending through to said lower end of said handle portion; and said first end of said shaft portion being detachably threadedly coupled to said head of said whip portion such that said whip portion is threadedly mounted to said handle portion and said shaft portion for providing two securements for said whip portion.

2. The cooking utensil of claim 1, wherein said second end of said shaft portion has a resiliently deformable abutting flange extending therearound, said abutting flange engaging said upper end of said handle portion.

3. The cooking utensil of claim 2, wherein said shaft portion has an annular channel extending therearound adjacent said abutting flange of said second end of said shaft portion for permitting flexing of said abutting flange when said shaft portion is tightened against said upper end of said handle portion for forming a seal between said abutting flange and said handle portion.

4. The cooking utensil of claim 3, wherein said second end of said shaft portion has a loop extending therefrom adapted to receive a hook for hanging of said shaft portion from said hook.

5. The cooking utensil of claim 1, wherein said handle portion has first and second portions being threadedly coupled together.

6. The cooking utensil of claim 1, wherein said lower end of said handle portion is internally threaded, said head of said whip portion being externally threaded and being threadedly coupled to said lower end of said handle portion.

7. The cooking utensil of claim 1, wherein said head of said whip portion has a threaded bore extending centrally therein opposite said loops, said first end of said shaft portion being externally threaded and threadedly coupled to said threaded bore of said head of said whip portion.

8. The cooking utensil of claim 1, wherein said handle portion has a resiliently deformable gripping sleeve extending therearound, said gripping sleeve being adapted for frictionally engaging a hand of a user for helping to prevent slipping of the hand along said handle portion.

9. The cooking utensil of claim 8, wherein said gripping sleeve has a series of protuberances extending outwardly therefrom for preventing slipping of fingers of a hand therealong.

10. The cooking utensil of claim 1, wherein said handle portion has a series of protuberances extending outwardly therefrom for preventing slipping of fingers of a hand therealong.

11. The cooking utensil of claim 10, wherein said protuberances are aligned in a single row generally parallel to said longitudinal axis of said handle portion.

12. A cooking utensil for mixing foods, comprising:

an elongate tubular handle portion having an upper end and a lower end and a longitudinal axis extending between said ends;

said lower end of said handle portion being internally threaded;

said upper end of said handle portion having an aperture therethrough;

a whip portion having a head and a plurality of overlapping resiliently deformable loops extending from said head, said head of said whip portion being externally threaded and being threadedly coupled to said lower end of said handle portion, such that the outer surface of said handle portion and the non-threaded portion of said whip head are flush with each other;

said head of said whip portion having a threaded bore extending centrally therein opposite said loops;

wherein said head of said whip portion has seven loops;

an elongate shaft portion having opposite first and second ends and a longitudinal axis extending between said ends, said shaft portion being removably insertable in said handle portion;

said first end of said shaft portion being externally threaded and threadedly coupled to said threaded bore of said head of said whip portion for further securing the whip portion and handle portions;

said second end of said shaft portion having a generally circular abutting flange extending therearound generally perpendicularly to said longitudinal axis of said shaft portion, said abutting flange engaging said upper end of said handle portion;

said abutting flange of said second end of said shaft portion having an outer diameter greater than the inner diameter of said aperture of said upper end of said handle portion;

said shaft portion having an annular channel extending therearound adjacent said abutting flange of said second end of said shaft portion for permitting flexing of said abutting flange when said shaft portion is tightened against said upper end of said handle portion for forming a seal between said abutting flange and said handle portion;

said second end of said shaft portion having a loop extending therefrom adapted to receive a hook for hanging of said shaft portion from said hook and for providing a grip for a user when disassembling said cooking utensil;

said handle portion having first and second portions being threadedly coupled together for facilitating disassembly and cleaning, said first portion being positioned towards said upper end of said handle portion, said second portion being positioned towards said lower end of said handle portion;

said first portion of said handle portion having a resiliently deformable gripping sleeve extending therearound, said gripping sleeve being adapted for frictionally engaging a hand of a user for helping prevent slipping of the hand along said handle portion;

said first portion of said handle portion having a series of protuberances extending outwardly therefrom for preventing slipping of fingers of a hand therealong;

wherein said protuberances are aligned in a single row generally parallel said longitudinal axis of said handle portion; and wherein said gripping sleeve extends outwardly over said protuberances.

* * * * *